United States Patent
Fittock et al.

(10) Patent No.: US 7,267,874 B2
(45) Date of Patent: Sep. 11, 2007

(54) COBALT ENCAPSULATED NICKEL HYDROXIDES AND BASIC CARBONATES FOR BATTERY ELECTRODES

(75) Inventors: John Ernest Fittock, Annandale (AU); Cheryl Christine Lucas, Belgian Gardens (AU); Katherine Fiona Howison, West End (AU)

(73) Assignee: QNI Technology Pty. Ltd., Brisbane (AU)

( * ) Notice: Subject to any disclaimer, the term of this patent is extended or adjusted under 35 U.S.C. 154(b) by 511 days.

(21) Appl. No.: 10/635,906

(22) Filed: Aug. 7, 2003

(65) Prior Publication Data

US 2004/0091414 A1    May 13, 2004

Related U.S. Application Data

(63) Continuation of application No. PCT/AU02/00119, filed on Feb. 7, 2002.

(30) Foreign Application Priority Data

Feb. 8, 2001    (AU) .................................... PR2953

(51) Int. Cl.
  *H01M 4/00*    (2006.01)
  *C01B 31/30*    (2006.01)
(52) U.S. Cl. .................... 428/389; 429/223; 423/420.2
(58) Field of Classification Search ................ 423/140, 423/144, 420.2; 428/680, 389; 427/216
  See application file for complete search history.

(56) References Cited

U.S. PATENT DOCUMENTS 2,879,137 A * 3/1959 Bare et al. .................. 423/144
3,928,068 A   12/1975 Jackovitz et al.
5,910,296 A    6/1999 Lee et al.
6,040,007 A    3/2000 Junichi et al.

FOREIGN PATENT DOCUMENTS

EP    0 720 247    7/1996

(Continued)

OTHER PUBLICATIONS

Derwent Abst. Acc. No0. 2000-353319/31; JP 2000-077070; Sumitomo Metal Mining Co., Mar. 14, 2000.
Derwent Abst. Acc. No. 99-0138623/12; JP 11-007954 Sumitomo Metal Mining Co., Jan. 12, 1999.

(Continued)

*Primary Examiner*—Stuart L. Hendrickson
*Assistant Examiner*—Daniel C. McCracken
(74) *Attorney, Agent, or Firm*—William E. Jackson; Stites & Harbison PLLC

(57) ABSTRACT

A process for producing a cobalt III encapsulated nickel hydroxide or basic nickel carbonate product including the steps of:
  (i) providing an ammoniacal solution including cobalt ammine complexes and nickel II ammine complexes;
  (ii) progressively lowering the ammonia content to sequentially precipate the nickel as an hydroxide or basic carbonate; and
  (iii) further lowering the ammonia content to precipitate the majority of the cobalt as cobalt III oxide hydroxide;
  wherein the majority of cobalt III oxide hydroxide coats on the surface of the precipitate nickel hydroxide or basic nickel carbonate to form a coated particle.

12 Claims, 4 Drawing Sheets

FOREIGN PATENT DOCUMENTS

| | | |
|---|---|---|
| EP | 0 727 834 | 8/1996 |
| EP | 0 851 516 | 7/1998 |
| EP | 856899 | 8/1998 |
| WO | WO96/14666 | 5/1996 |
| WO | WO98/05592 | 2/1998 |

OTHER PUBLICATIONS

Derwent Abst. Acc., No. 99-08719608; JP 10-321229, Sumitomo Metal Mining Co.; Apr. 4, 1998.

Derwent Abst. Acc., No. 98-163570/15, JP 10-029820; Nippon Chem. Ind. Co. Ltd., Feb. 3, 1998.

* cited by examiner

COBALT ENCAPSULATED NICKEL HYDROXIDES AND BASIC CARBONATES FOR BATTERY ELECTRODES

CROSS-REFERENCE TO RELATED APPLICATIONS

This application is a continuation of International Application No. PCT/AU02/00119, filed Feb. 7, 2002.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Field of the Invention

The present invention relates to a process for the preparation of a nickel-cobalt hydroxy carbonate product, particularly to the preparation of an encapsulated nickel hydroxide or basic nickel carbonate compound suitable for use as battery chemicals. In particular, the present invention relates to a process for the preparation of cobalt oxide hydroxide (CoOOH) coated nickel hydroxide or basic nickel carbonate particles. The basic nickel carbonate may have the typical structure [$NiCO_3 \cdot 2Ni(OH)_2 \cdot 4H_2O$], however particles having other carbonate/hydroxy ratios may be present.

The invention also relates to a nickel-cobalt hydroxy carbonate product, particularly to a coated nickel hydroxide or basic nickel carbonate product, produced by the process of the invention described herein.

The nickel-cobalt hydroxy carbonate product of the invention may be used as:

(a) an active material of a non sintered type positive electrode for alkaline storage batteries, or
(b) a component, when blended with lithium hydroxide and calcined, of lithium secondary batteries.

The increasing popularity of battery powered portable equipment requires batteries with increased capacity which in turn can be met by improving the utilization of nickel hydroxide used as an active material in the positive paste electrode.

2. Description of Related Art

With reference to (a) above, the prior art associated with the preparation of active material for alkaline batteries is reviewed.

It has been reported that coating the surface of nickel hydroxide particles with cobalt hydroxide is an effective way of achieving electrical conductivity between nickel hydroxide particles thus improving their utilization and consequently battery performance.

In U.S. Pat. No. 6,040,007, this end result of cobalt hydroxide coated nickel hydroxide particles is achieved in a two stage process where nickel hydroxide particles formed in one reactor are then transferred to a second reactor where cobalt hydroxide solids are precipitated onto the surface of the nickel hydroxide particles. The conversions of the cobalt hydroxide (cobalt II) to cobalt oxyhydroxide (cobalt II) can be done by post precipitation oxidation using electrochemical or chemical means such as persulphates and hypochlorites.

In European patent EP 0851516 A2, nickel hydroxide particles were prepared by the addition of aqueous sodium hydroxide to a nickel sulphate solution under controlled conditions to produce nickel hydroxide solids which were then coated with cobalt oxide hydroxide previously prepared by the dry oxidation of cobalt hydroxide solids at temperature. Again what is described is a two step process at least to achieve a cobalt encapsulation of nickel hydroxide with a higher valence cobalt oxide.

In U.S. Pat. No. 3,928,068, a process is described for the production of an electrode paste composed of the higher valence states of both Ni and Co. This material is prepared by adjusting the pH of an aqueous slurry of basic nickel carbonate and dissolved cobalt nitrate to precipitate cobalt hydroxide onto the basic nickel carbonate particles followed by hypochlorite oxidation of the resultant slurry.

This again is at least a two stage process prior to the oxidation step as the basic nickel carbonate solids have to be prepared initially. This latter step is not described in the patent.

European patent EPO 727834 A1 discloses the preparation of an active material for a non sintered electrode for use in alkaline storage cells comprising a solid solution of nickel hydroxide mixed with manganese and also incorporating other elements such as cobalt. The solids described in this patent were coprecipitated from aqueous solution by the addition of sodium hydroxide at controlled pH of 11. In this patent, no mention of utilization enhancement by encapsulation of the solid solution by cobalt hydroxide precipitation is made nor of the oxidation of the cobalt II compounds to a higher valence state.

European patent WO96/14666 describes the encapsulation of nickel hydroxide particles with cobalt hydroxide in a two step process where the aqueous slurry of nickel hydroxide solids is stirred vigorously with a cobalt sulphate solution during the addition of potassium hydroxide to pH 8. The encapsulating layer of cobalt hydroxide was then able to be oxidized electrochemically or by air oxidation immediately following precipitation.

With reference to (b) above some prior art descriptions are reviewed.

Patent EP0720247 A1 describes the preparation of composite hydroxides of nickel and cobalt by coprecipitation on the addition of caustic alkali to aqueous solutions containing cobalt and nickel salts. The composite hydroxides, when mixed with lithium hydroxide and heated to 750° C. form a single phase most suitable for positive electrodes in lithium secondary batteries.

Patent WO98/05592 describes the preparation of a nickel cobalt hydroxide composite precipitate by the addition of a base to an aqueous solution of nickel and cobalt sulfates at controlled pH of 10.5. When the composite hydroxide is blended with lithium hydroxide and calcined it forms a single phase lithium nickel cobalt dioxide suitable for lithium secondary batteries. The inventor also describes the use of cobalt III oxide ($CO_2O_3$) blended with nickel hydroxide and lithium hydroxide and calcined in the presence of potassium hydroxide.

It is apparent from the above prior art that the production of an active material for non sintered electrodes is only achieved by a series of consecutive steps.

The above discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed in Australia before the priority date of each claim of this application.

BRIEF SUMMARY OF THE INVENTION

It is an object of the present invention to overcome or at least alleviate one or more of the difficulties associated with the prior art.

An improvement on the prior art would be to produce a cobalt rich encapsulating layer on nickel hydroxide or basic nickel carbonate particles in one step without preparing the nickel solids in a separate first step.

A further improvement would be to encapsulate the nickel hydroxide or basic nickel carbonate solids with cobalt in oxidation state III in a one step process.

The present invention discloses how cobalt oxide hydroxide (cobalt in the trivalent state) can be deposited on the surface of nickel hydroxide or basic nickel carbonate particles wherein the cobalt and the nickel elements are present initially in the same solution.

The following describes how the desirable objective of a single stage process to encapsulate nickel hydroxide or basic nickel carbonate particles with cobalt can be achieved by using a combination of nickel and cobalt chemistry and precipitation kinetics.

In one aspect, the present invention resides in a process for producing a cobalt III encapsulated nickel hydroxide or basic nickel carbonate product including the steps of:

(i) providing an ammoniacal solution including cobalt ammine complexes and Ni II ammine complexes;

(ii) progressively reducing the ammonia content to sequentially precipitate the nickel as an hydroxide or basic carbonate;

(iii) further reduce the ammonia contents to precipitate the majority of the cobalt as Co III oxide hydroxide;

wherein the majority of the Co III oxide hydroxide coats on the surface of the precipitated nickel hydroxide or basic nickel carbonate to form a coated particle.

Whereas it is most preferred that the cobalt exists as a cobalt III ammine complex, it may be that some cobalt is precipitated in the divalent form, and will generally be precipitated with the nickel. The majority of the cobalt however will precipitate as the cobalt III oxide hydroxide.

In another aspect, the invention resides in a process for producing a nickel-cobalt hydroxy carbonate product including the steps of:

(i) providing an ammoniacal solution including cobalt ammine complexes and nickel II ammine complexes;

(ii) progressively reducing the ammonia content to precipitate the nickel as an hydroxide or basic nickel carbonate; and (iii) further reduce the ammonia content to precipitate the majority of the cobalt as a cobalt III oxide hydroxide; wherein the precipitate is substantially a coprecipitated layered nickel-cobalt hydroxy carbonate product.

Most preferably the cobalt is precipitated in oxidation state III, however some cobalt in oxidation state II may also have been precipitated with the nickel.

In another aspect, the present invention resides in a nickel-cobalt hydroxy carbonate product, particularly a coated nickel hydroxide or basic nickel carbonate product produced by the process described herein.

In ammoniacal solutions, cobalt is most stable in the trivalent state and many stable Co III ammine complexes have been isolated, characterized and reported in the literature. On the other hand, nickel exists in ammoniacal solutions as the Ni II ammine complex in a labile state and is not easily isolated as its ammine complex in solid form.

The oxidation of Co II to Co III in ammoniacal media is readily achieved by simple air sparging at normal temperatures and pressures or by the use of chemical oxidants such as hydrogen peroxide. The invention described herein preferably includes a step of oxidizing Co II to Co III prior to step (ii) of the process described above.

The difference in stabilities of the Ni and Co ammine complexes allows for their partial separation due to the fact that as the excess stabilizing free ammonia is removed from a nickel ammine solution, the nickel rapidly precipitates as the hydroxide or basic carbonate depending on the anionic structure of the ammoniacal liquor.

On the other hand, under these conditions the cobalt III ammine complexes remain in solution and are not precipitated to any significant extent until nearly all of the nickel has precipitated. As the ammonia content of the solution is further reduced the Co III ammine complexes are decomposed and precipitate as Co III oxide hydroxide onto the surface of the existing nickel hydroxide or basic nickel carbonate solids.

Whereas in the preferred form of the invention the cobalt III hydroxide will coat the nickel hydroxide or nickel carbonate product, in another aspect of the invention, the nickel and cobalt may largely coprecipitate to form a layered double nickel-cobalt hydroxide carbonate product. This product may take the form $Ni_6^{2+}Co_2^{3+}(OH)_{16}CO_3.4H_2O$. SEM characterization of the product shows particles of differing morphologies. This may be as a result of the cobalt existing in both the $Co^{2+}$ and $Co^{3+}$ oxidation states.

The removal of $NH_3$ from an ammoniacal ammonium carbonate solution or an ammonium hydroxide solution is preferably achieved by indirect heating such as a distillation kettle, direct steam sparging or in a batch reactor. Laboratory tests conducted to determine the most suitable production method found that batch reactor was the most successful in achieving appropriate product specifications.

The cobalt tends to coat the nickel particles forming an encapsulated particle.

Figure 1:
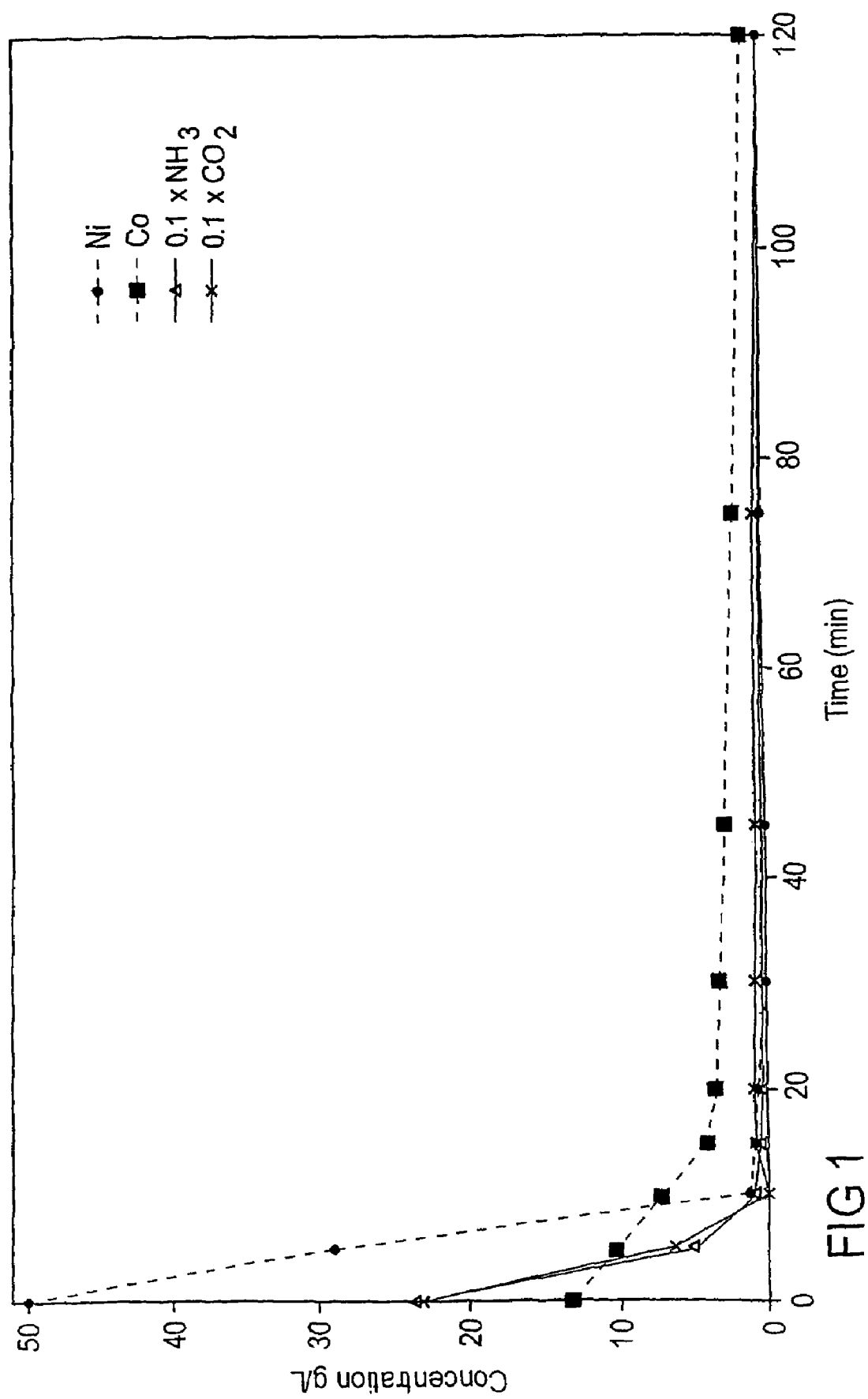
FIG. 1 illustrates the concentration of nickel and cobalt in the precipitate against time following high steam stripping. It can be seen from this that the majority of the nickel has precipitated prior to the precipitation of the cobalt.
Figure 2:
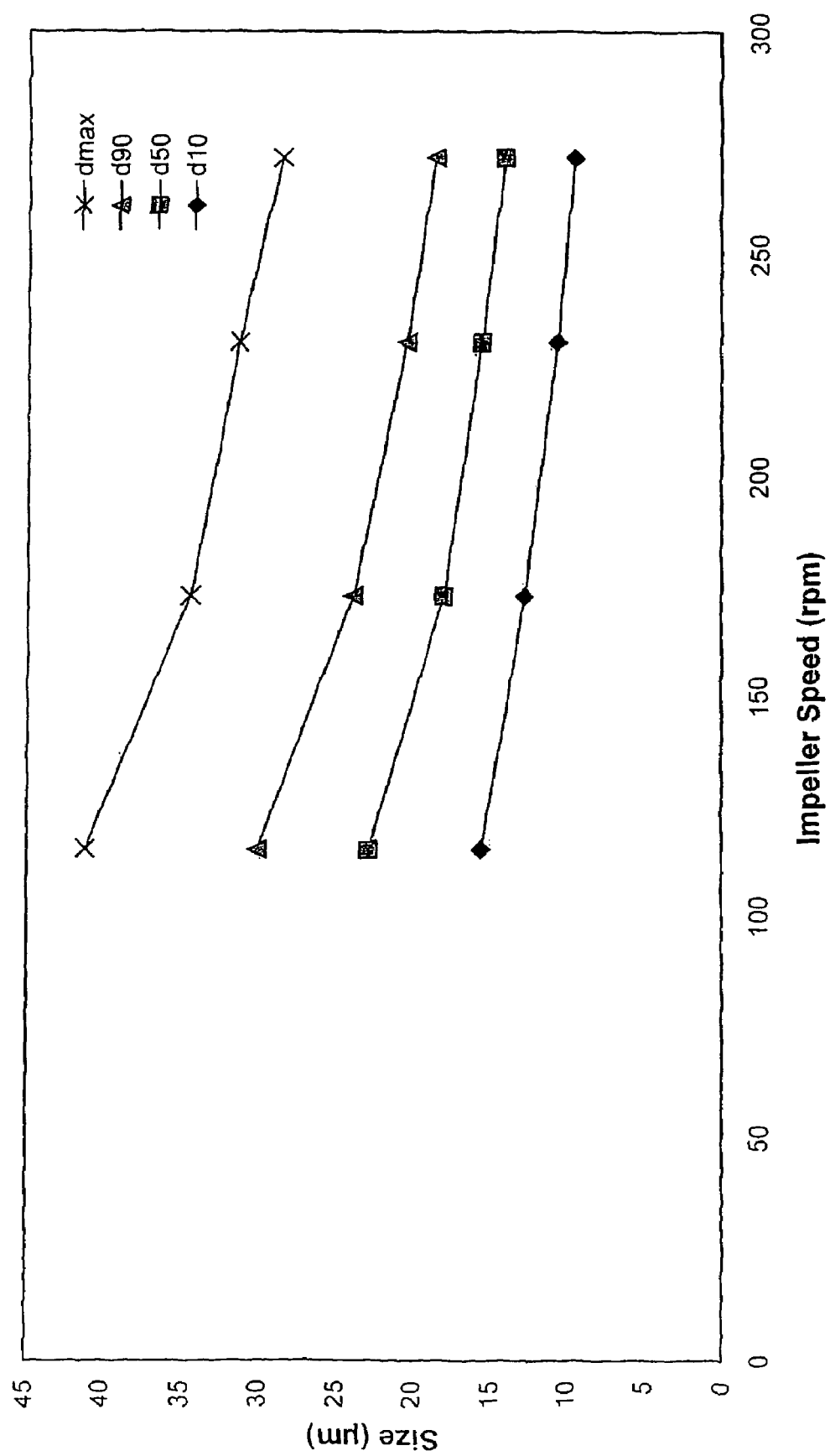

FIG. 2 illustrates the effect of impeller speed on particle size.

Figure 3:
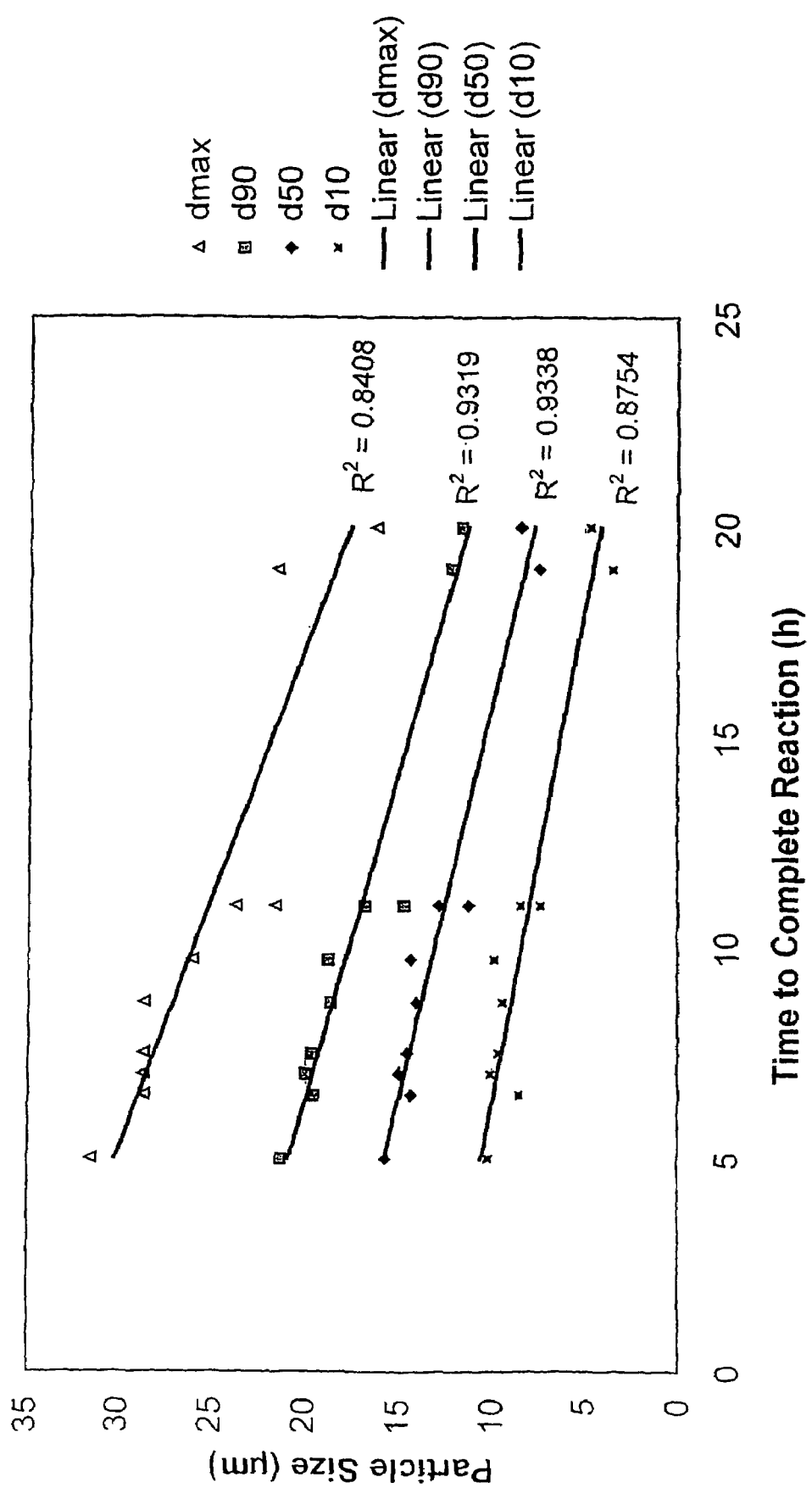

FIG. 3 illustrates the relationship between particle size and reaction rate.

Figure 4:
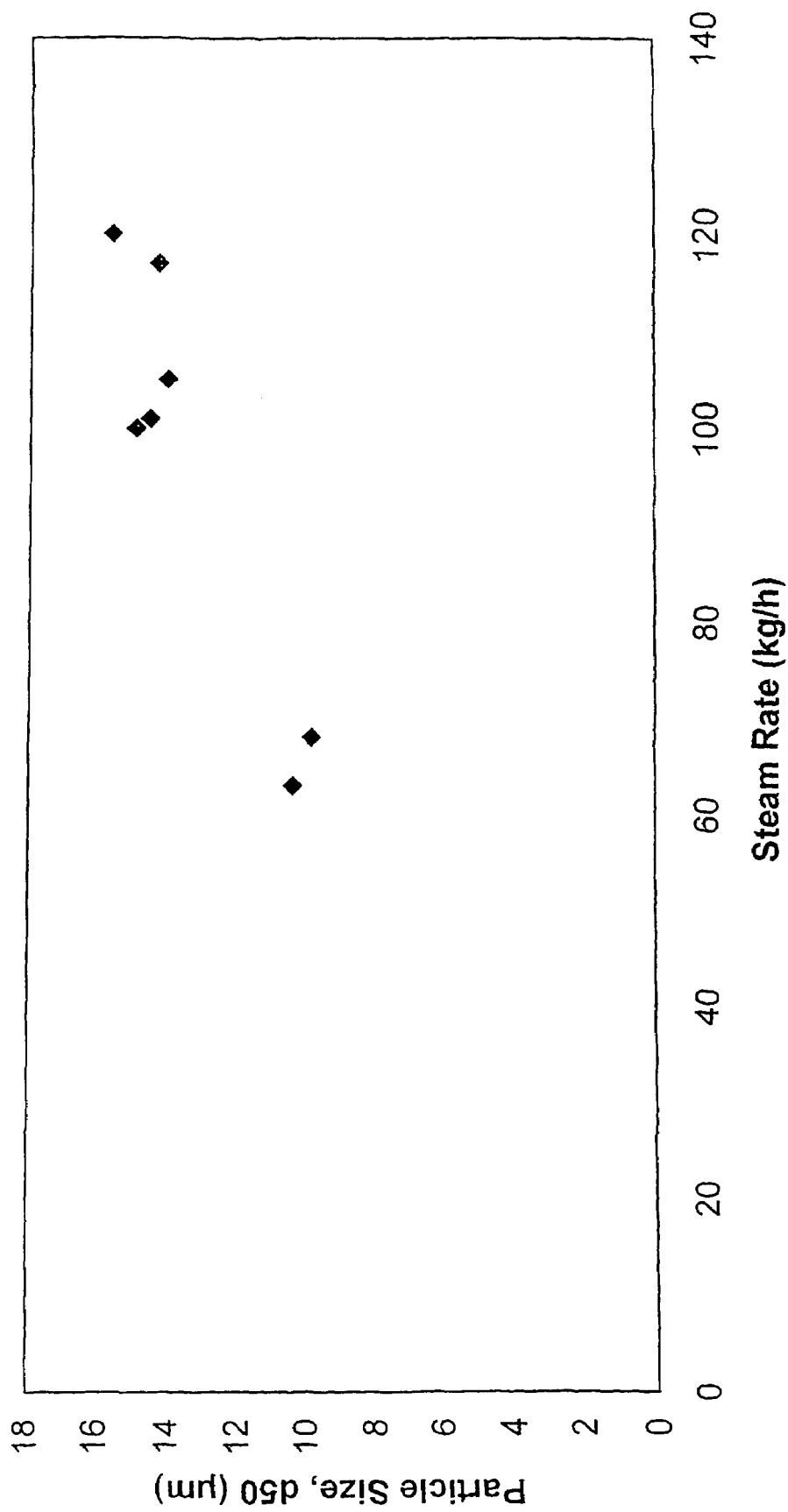

FIG. 4 illustrates the effect of steam rate on particle size.

DETAILED DESCRIPTION

EXAMPLE 1

300 g of nickel-cobalt hydroxy carbonate was produced by reducing the ammonium content from an ammoniacal solution containing cobalt ammine complexes and nickel II ammine complexes. Evaluation of the product showed the following:

$D_{50}$=10 μm

Co/(Co+Ni)=0.18

$Co^{III}$/Co=0.093

The performance of the feed material was about 180 mAh/g. [LINICOOZ] was produced from this sample following blending with lithium hydroxide.

EXAMPLE 2

2 kg of Ni(II) and Co(II) hydroxy carbonate and 1 kg of Ni (II) Co (III) hydroxy carbonate were produced by the process of Example 1. Analysis of these samples for suitability for battery chemicals showed:

Ni (II) Co(III) hydroxy carbonate was preferable to Ni (II) Co (II) hydroxy carbonate.

The Ni(II) Co (II) hydroxy carbonate samples had a Co/(Co+Ni) ratio of from 0.16-0.165.

Moisture content of $NiCo^{3+}$ did not affect specific capacity result.

$NiCo^{3+}$ surface area was within required limits for battery chemical use.

$NiCo^{2+}$ surface area was above the upper limit for battery chemical use.

EXAMPLE 3

Two further 10 kg batches of nickel-cobalt hydroxy carbonate were produced for evaluation in accordance with the method as outlined in Example 1. The SSA measurements of the first samples were 12.3 to 21.0 m²/g ; tap density 0.63-0.74; $D_{50}$ of 9.5 to 11.3 μm. The charge-discharge curve for one sample from the first batch showed better performance than existing standard products.

EXAMPLE 4

500-1000 kg (wet basis) of nickel-cobalt hydroxy carbonate product was produced according to the process of Example 1 from $NiCo^{3+}$ starting liquors. The raw material from a sample of this batch had a surface Co/(Co+Ni) ratio of 0.69 while the product produced from this sample had a Co/(Co+Ni) ratio of 0.2.

It has been found following these trials that both agitation speed and steam addition rate, which affects reaction rate, can be used to control the particle size. FIG. 2 indicates the effect of varying agitation rate on the particle size. FIGS. 3 & 4 indicate the effect of changes of steam rate and hence reaction rate on the particle size. Steam addition rate appears to affect particle morphology.

What has been disclosed is an elegant and readily effected one stage procedure for the preparation of Co III encapsulated basic nickel carbonate solids or nickel-cobalt hydroxy carbonate solids suitable for incorporation into non sintered positive electrodes for alkaline battery manufacture or for blending with other material such as LiOH or an LiOH/KOH mixture for use in lithium secondary battery production.

It is to be understood that further modifications or alterations that do not depart from the spirit or ambit of the invention described herein are to be considered to form part of the invention.

The invention claimed is:

1. A process for producing cobalt III encapsulated basic nickel carbonate particles including the steps of:
   (i) providing an ammoniacal ammonium carbonate solution including cobalt III ammine complexes and nickel II ammine complexes;
   (ii) progressively lowering the ammonia and carbon dioxide content to precipitate the majority of the nickel as basic nickel carbonate particles; and
   (iii) further lowering the ammonia and carbon dioxide content to precipitate the majority of the cobalt as cobalt III oxide hydroxide;

wherein the majority of cobalt III oxide hydroxide coats on the surface of the precipitated basic nickel carbonate particles to form coated particles.

2. A process for producing a cobalt III encapsulated nickel hydroxyl carbonate/cobalt III oxide hydroxide mixed particles including the steps of:
   (i) providing an ammoniacal ammonium carbonate solution including cobalt III ammine complexes and nickel II ammine complexes;
   (ii) progressively lowering the ammonia and carbon dioxide content to precipitate some of the cobalt as cobalt III oxide hydroxide and the majority of the nickel as basic nickel carbonate to form layered nickel hydroxyl carbonate/cobalt III oxide hydroxide mixed particles; and
   (iii) further lowering the ammonia and carbon dioxide content to precipitate the majority of the remaining cobalt as cobalt III oxide hydroxide;

wherein the precipitated cobalt III oxide hydroxide from step (iii) coats on to the surface of the layered nickel hydroxyl carbonate/cobalt III oxide hydroxide mixed particles to form coated particles.

3. A process according to claim 1 or 2 wherein any cobalt II is converted to cobalt III prior to step (ii).

4. A process according to claim 3 wherein the cobalt II is converted to cobalt III by air sparging at normal temperatures and pressures, or by the use of a chemical oxidant.

5. A process according to claim 4 wherein the chemical oxidant is hydrogen peroxide.

6. A process according to claim 1 or 2 wherein the basic nickel carbonate product is $[NiCO_3.2Ni(OH)_2.4H_2O]$.

7. A cobalt III encapsulated basic nickel carbonate product produced by the process according to claim 1.

8. A cobalt III encapsulated nickel hydroxy carbonate/cobalt III oxide hydroxide mixed particle product produced by the process according to claim 2.

9. A cobalt III encapsulated basic nickel carbonate product produced by the process of claim 1, when used as a non-sintered positive electrode for an alkaline storage battery.

10. A cobalt III encapsulated nickel hydroxyl carbonate/cobalt III oxide hydroxide mixed particle product produced by the process according to claim 2, when used as a non-sintered positive electrode for an alkaline storage battery.

11. A process according to claim 1 further including the step of blending the cobalt III encapsulated basic nickel carbonate particles with lithium hydroxide or a lithium hydroxide/potassium hydroxide mixture to produce a material suitable for use in lithium secondary battery production.

12. A process according to claim 2 further including the step of blending the cobalt III encapsulated layered nickel hydroxyl carbonate/cobalt III oxide hydroxide mixed particles with lithium hydroxide or a lithium hydroxide/potassium hydroxide mixture to produce a material suitable for use in lithium secondary battery production.

* * * * *